ent [19] [11] 3,906,022
Phillips [45] Sept. 16, 1975

[54] SUBSTITUTED DICHLOROMETHANE SULFENYL ESTERS AND THEIR MANUFACTURE

[75] Inventor: Wendell Gary Phillips, Olivette, Mo.
[73] Assignee: Monsanto Company, St. Louis, Mo.
[22] Filed: June 7, 1974
[21] Appl. No.: 477,391

Related U.S. Application Data
[62] Division of Ser. No. 172,316, Aug. 16, 1971, Pat. No. 3,843,705.

[52] U.S. Cl............................................. 260/456 A
[51] Int. Cl.$^2$..................................... C07C 145/00
[58] Field of Search............................. 260/456 NS

[56] References Cited
UNITED STATES PATENTS
2,929,824   3/1960   Kharasch ..................... 260/456 NS OTHER PUBLICATIONS
Newman et al., Chem. Abstract, 71, 12814X (1969).

*Primary Examiner*—Bernard Helfin
*Assistant Examiner*—Nicky Chan
*Attorney, Agent, or Firm*—William I. Andress

[57] ABSTRACT

Substituted dichloromethane sulfenyl esters are prepared from dichloromethane sulfenyl chlorides by reaction with an alcohol in the presence of an HCl scavenger. The substituted dichloromethane sulfenyl esters are pesticidally active and particularly useful as pre-emergent herbicides.

4 Claims, No Drawings

SUBSTITUTED DICHLOROMETHANE SULFENYL ESTERS AND THEIR MANUFACTURE

This is a division, of application Ser. No. 172,316 filed Aug. 16, 1971 now U.S. Pat. No. 3,843,705.

This invention relates to substituted dichloromethane sulfenyl esters of the formula $$E-CCl_2-S-OR^1 \text{ or}$$
$$E-CCl_2-S-OR^2\ O-S-CCl_2-E$$

and their manufacture from the corresponding dichloromethane sulfenyl chlorides of the formula $$E-CCl_2-S-Cl$$

and an alcohol of the formula $$R^1OH \text{ or } R^2(OH)_2$$

wherein E- is

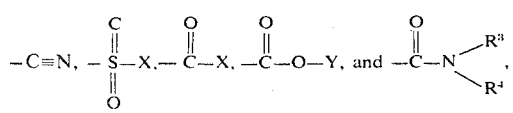

X is phenyl, halophenyl or lower alkyl phenyl, Y is lower alkyl or benzyl, $R^1$ is lower alkenyl methylene, lower alkynyl methylene, phenyl, halophenyl, lower alkyl phenyl, or lower alkyl, $R^2$ is phenylene, lower alkyl phenylene or halophenylene, $R^3$ is lower alkyl or lower alkoxyalkyl, $R^4$ is phenyl, halophenyl, lower alkyl phenyl, lower alkyl or lower alkoxyalkyl, or $R^3$ and $R^4$ when taken together are alkylene of the empirical formula $C_nH_{2n}$ wherein n is an integer from 4 through 8, inclusive, and having from 4 through 8 carbons in a continuous chain between the nitrogen terminal valence bonds.

Lower alkyl is alkyl having from 1 to 5 carbons. Examples of lower alkyl include, but are not limited to, methyl, ethyl, propyl, isopropyl, butyl, sec-butyl, isobutyl, tert-butyl, and pentyl.

Lower alkoxy have from 1 to 5 carbons. Examples of lower alkoxy include, but are not limited to, methoxy, ethoxy, propoxy, butoxy and pentoxy. Lower alkoxyalkyl have from 2 to 8 carbons. Examples of lower alkoxyalkyl are propoxymethyl, butoxybutyl, butoxyethyl, methoxymethyl, and ethoxypropyl.

Halo is a halogen selected from the group consisting of fluorine, chlorine, bromine and iodine.

Lower alkenyl and lower alkynyl have from 2 through 4 carbons. Examples of lower alkenyl include, but are not limited to vinyl, allyl and crotyl. Examples of lower alkynyl include, but are not limited to, ethynyl, 2-propynyl (propargyl), 1-methyl-2-propynyl, 2-butynyl, and 3-butynyl. In compounds of this invention lower alkenyl and lower alkynyl are attached to the hydroxyl group by a methylene group so that the carbon adjacent to the oxygen is always saturated. Thus, alcohols useful in the present invention wherein $R^1$ is lower alkenyl methylene or lower alkynyl methylene can be referred to as alkenyl carbinols or alkynyl carbinols respectively.

Exemplary of halophenyl and lower alkyl phenyl are substituted phenyls of the formula

wherein Z is halo, trihalomethyl, or lower alkyl and m is an integer from 1 through 3, inclusive.

Preferred compounds of the formula $R^2(OH)_2$ are 1,3-dihydroxybenzene of the formula

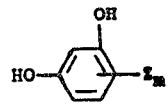

wherein Z and m have the aforementioned significance. When the phenyl ring of the 1,3-dihydroxybenzene contains substituents represented by Z, it is preferred that the number 2 position on the ring is occupied by a hydrogen.

Examples of heterocyclic groups of nitrogen and alkylene of the empirical formula $C_nH_{2n}$ wherein n is an integer from 4 through 8, inclusive, and having from 4 through 8 carbons in a continuous chain between the nitrogen terminal valence bonds include but are not limited to pyrrolidinyl, piperidinyl, hexamethyleneimino, heptamethyleneimino, octamethyleneimino, 2-ethylpyrrolidinyl, 3-butylpyrrolidinyl, 2,5-dimethylpyrrolidinyl, 2,5-diethylpyrrolidinyl, 3,4-dimethylpyrrolidinyl, 2-pipecolinyl, 3-pipecolinyl, 4-pipecolinyl, 2,6-dimethylpiperidinyl, 2-ethyl-6-methylpiperidinyl, 2-propylpiperidinyl, 3-methylhexamethyleneimino, 3,4-dimethylhexamethyleneimino, and the various isomeric forms thereof.

The compounds of this invention are conveniently and efficiently prepared by the reaction, in the presence of an HCl scavenger, of an alcohol of the formula $R^1OH$ or $R^2(OH)_2$ with about the stoichiometric amount of a dichloromethane sulfenyl chloride of the formula E-CCl$_2$-S-Cl wherein E, $R^1$, and $R^2$ have the aforementioned significance. When the alcohol is of the formula $R^1OH$, the reaction, in the presence of an HCl scavenger, of about equimolecular proportions of the alcohol and the dichloromethane sulfenyl chloride of the formula E-CCl$_2$-S-Cl wherein E and $R^1$ have the aforementioned significance, is postulated to proceed as follows:

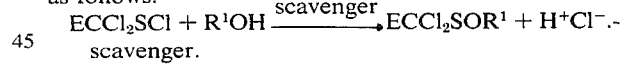

scavenger.

When the alcohol is a substituted or unsubstituted dihydroxybenzene of the formula $R^2(OH)_2$, the reaction, in the presence of an HCl scavenger, of about 2 molecular proportions of a dichloromethane sulfenyl chloride of the formula E-CCl$_2$-S-Cl and 1 molecular proportion of a dihydroxybenzene is postulated to proceed as follows:

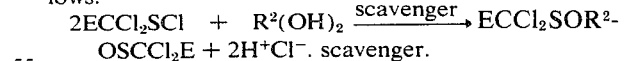

The HCl scavenger must be present in at least an equimolecular amount as compared to the substituted sulfenyl chloride. Generally not more than twice the equimolecular amount of scavenger is useful although the maximum amount is not critical. The type of scavenger is not critical to the invention so long as it does not interfere with the reaction of the alcohol and the substituted sulfenyl chloride. Preferred scavengers are trialkyl amines. More preferred trialkyl amines have from 2 through 5 carbons in the alkyl groups.

The reaction mass may consist only of the aforedescribed reactants and their reaction products, or it may contain other components in addition such as diluents, other inert materials and solvents, i.e., common organic liquids which are inert under the reaction conditions and which may dissolve one or more of the reactants or products of the reaction, which solvents are exemplified by, but not limited to, aliphatic hydrocarbons, such as pentane, hexane, mineral spirits, etc., aromatics such as benzene, toluene, xylenes, etc., ethers such as diethyl ether, diisopropyl ether, petroleum ether, etc., esters such as methyl acetate, ethyl acetate, propyl acetate, etc., and other organics such as tetrahydrofuran, etc. The hydrochloride salt by-product is generally not soluble in the above solvents. Accordingly, the insoluble salt usually forms a precipitate in the reaction mass and may be easily removed by filtration. When filtration is not desired or the salt is soluble in the solvent, the salt may be readily removed from the reaction mass by extraction with water.

The alcohol may be present in excess since the sulfenyl chloride will generally not react further after the sulfurchlorine bond is broken. Thus, where the alcohol is readily available or of low value in comparison to the sulfenyl chloride, it may be preferable to use an amount of alcohol far in excess of the stoichiometric amount to assure complete reaction of the sulfenyl chloride. The amount of alcohol added is not critical to conducting the reaction but merely is determinative of the yield of ester.

The reaction is normally carried out at a temperature above the freezing point of the system but preferably not above its boiling point. Still more preferably, the reaction is carried out at temperatures of from about 0° Centigrade (°C.) to about 60°C. The reaction is usually carried out at atmospheric pressure, but higher or lower pressures may be utilized if equipment and other factors favor such higher or lower pressures. The reaction may be carried out in an open vessel or under reflux.

Substituted dichloromethane sulfenyl esters of this invention are useful as biocides. Exemplary of such biocidal uses for these products is the control of nematodes, arachnides, arthropods and insects as well as eradication of noxious weeds. These compounds are particularly useful as pre-emergent and contact herbicides.

Pre-emergent and contact herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g., power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

Manufacture of dichloromethane sulfenyl chlorides, used as starting materials in the preparation of the compounds of the present invention, is taught in my prior U.S. Pat. applications Ser. Nos. 139,976 and 139,978 filed May 3, 1971, and each entitled "Substituted Alpha, Alpha-Dichloro-Methane Sulfenyl Chlorides and Their Manufacture".

Alcohols used in the preparation of the compounds of the present invention are either known compounds or may be prepared by prior art methods from known compounds.

As illustrative of this invention, but not limitative thereof, is the following:

EXAMPLE 1

To a suitable reaction vessel equipped with an agitator is charged approximately 100 milliliters (ml.) of diethyl ether. Approximately 3.12 grams (g.), about 0.01 moles, of 2-(chlorothio)-2,2-dichloro N-isopropylacetanilide is dissolved in the ether. Approximately 1.1 g., about 0.01 moles, of triethylamine is then added. A precipitate forms almost immediately. After about 5 minutes approximately 1 gram of methanol which is in excess of 0.01 moles is added. The mass is stirred for about 1 hour (hr.). The precipitate is then removed by filtration. Thereafter the ether is removed by distillation leaving an oily residue. The oil is cooled in dry ice and, upon scratching a white solid crystallizes out of the solution. The white solid is separated from the liquid by filtration, is found to have a melting point of about 61° to 64°C. and is identified as methyl dichloro(N-isopropyl-N-phenylcarbamoyl)methane sulfenate

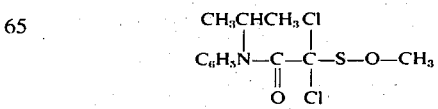

Calculated for $C_{12}H_{15}Cl_2NO_2S$: C, 46.76; H, 4.91; N, 4.54

Found: C, 46.12; H, 4.39; N, 4.60

EXAMPLE 2

To a suitable reaction vessel equipped with an agitator is charged about 100 ml. of diethyl ether. Approximately 1.01 g., about 0.01 moles, of triethylamine, approximately 0.58 g., about 0.01 moles of allyl alcohol, and approximately 3.1 g., about 0.01 moles, of 2-(chlorothio)-2,2-dichloro-N-isopropylacetanilide are dissolved in the ether. The mass is stirred for about 2 hours, the precipitate which forms while the mass is being stirred, is removed from the liquid by filtration and the ether is then removed by distillation. The oily residue is cooled in dry ice, and crystallization is initiated by scratching the interior surface of the vessel below the liquid surface. The resultant solid is then recrystallized from petroleum ether. The white solid obtained is found to have a melting point of about 101° to 104°C. and is identified as allyl dichloro(N-isopropyl-N-phenylcarbamoyl)methane sulfenate

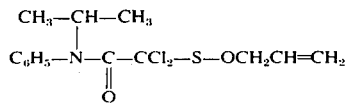

Calculated for $C_{14}H_{17}Cl_2NO_2S$: C, 50.30; H, 5.13; N, 4.17

Found: C, 50.88; H, 4.89; N, 4.35

EXAMPLE 3

To a suitable reaction vessel equipped with an agitator is charged approximately 100 ml. of benzene. Approximately 5.6 g. about 0.02 moles, of dichloro(diisopropylcarbamoyl)methane sulfenyl chloride, approximately 2 g., about 0.02 moles, of triethylamine and approximately 1 g., in excess of 0.02 moles, of methanol is then added. A precipitate forms almost immediately. The mass is heated with stirring to about 70°C. and maintained at about 70°C. for about 1 hour (hr.). The mass is cooled to about room temperature, about 23°C., and the precipitate is removed by filtration. Thereafter the benzene is removed by distillation leaving an oily residue. The oil is dissolved in pentane and, upon cooling in dry ice, a white solid crystallizes out of the solution. The white solid is separated from the liquid by filtration, is recrystallized from petroleum ether and is found to have a melting point of about 77° to 79°C. and is identified as methyl dichloro(diisopropylcarbamoyl)methane sulfenate

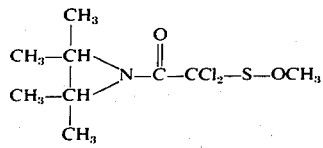

Calculated for $C_9H_{11}Cl_2NO_2S$: C, 39.42; H, 6.25

Found: C, 39.72; H, 6.43

EXAMPLE 4

To a suitable reacton vessel equipped with an agitator is charged approximately 150 ml. of benzene. Approximately 5.6 g., about 0.02 moles, of dichloro(diisopropylcarbamoyl)methane sulfenyl chloride and approximately 3.2 g., about 0.02 moles, of meta-trifluoromethyl phenol is dissolved in the benzene. Then approximately 2 grams, about 0.02 moles, of triethyl amine is added. A precipitate forms almost immediately. The precipitate is removed by filtration. Thereafter the benzene is removed by distillation leaving an oily residue. The oil is dissolved in pentane and, upon cooling in dry ice, a white solid crystallizes out of the solution. The white solid is separated from the liquid by filtration, is found to have a melting point of about 38° to 40°C. and is identified as meta-trifluoromethylphenyl dichloro(diisopropylcarbamoyl)methane sulfenate

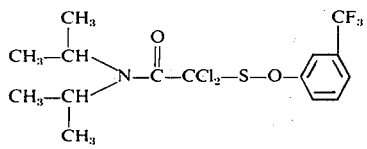

EXAMPLE 5

To a suitable reaction vessel equipped with an agitator is charged approximately 150 ml. of benzene. Approximately 11.2 g., about 0.04 moles, of dichloro(diisopropylcarbamoyl)methane sulfenyl chloride and approximately 2.2 g., about 0.02 moles, of resorcinol is dissolved in the benzene. Then approximately 4 g., about 0.04 moles, of triethyl amine is added. A precipitate forms almost immediately. The precipitate is removed by filtration. Thereafter the benzene is removed by distillation leaving an oily residue. The oil is dissolved in pentane and, upon cooling in dry ice, a white solid crystallizes out of the solution. The white solid is separated from the liquid by filtration, is recrystallized from petroleum ether, is found to have a melting point of about 128° to 130°C. and is identified as 1,3-phenylene bis[dichloro(diisopropylcarbamoyl)methane sulfenate]

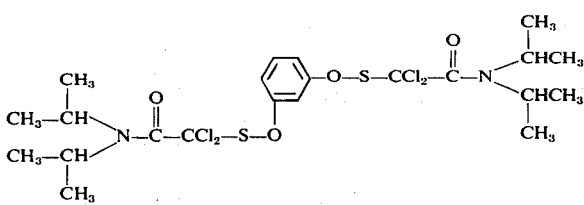

Calculated for $C_{22}H_{32}Cl_4N_2O_4S_2$: C, 44.45; H, 5.43

Found: C, 44.62; H, 5.55

EXAMPLE 6

To a suitable reaction vessel equipped with an agitator is charged approximately 150 ml. of benzene. Approximately 5.6 g., about 0.02 moles, of dichloro(diisopropylcarbamoyl)methane sulfenyl chloride and approximately 2.7 g., about 0.02 moles, of 3,4,5-trimethylphenol is dissolved in the benzene. Then approximately 2 g., about 0.02 moles, of triethyl amine is added. A precipitate forms almost immediately. The precipitate is removed by filtration. Thereafter the benzene is removed by distillation leaving an oily residue. The oil is dissolved in pentane and, upon cooling in dry ice, a white solid crystallizes out of the solution. The white solid is separated from the liquid by filtration, is recrystallized from petroleum ether, is found to have a melting point of about 96° to 98°C. and is identified as 3,4,5-trimethylphenyl dichloro(diisopropylcarbamoyl)methane sulfenate

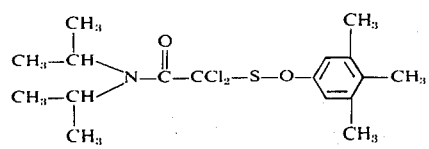

Calculated for $C_{17}H_{25}Cl_2NO_2S$: C, 53.96; H, 6.66
Found: C, 53.92; H, 6.79

EXAMPLE 7

To a suitable reaction vessel equipped with an agitator is charged approximately 150 ml. of benzene. Approximately 5.6 g., about 0.02 moles, of dichloro(diisopropylcarbamoyl) methane sulfenyl chloride and approximately 2.52 g., about 0.02 moles, of meta-chlorophenol is dissolved in the benzene. Then approximately 2 g., about 0.02 moles of triethyl amine is added. A precipitate forms almost immediately. The precipitate is removed by filtration. Thereafter the benzene is removed by distillation leaving an oily residue. The oil is dissolved in pentane and, upon cooling in dry ice, a white solid crystallizes out of the solution. The white solid is separated from the liquid by filtration, is found to have a melting point of about 85° to 89°C. and is identified as meta-chlorophenyl dichloro(diisopropylcarbamoyl)methane sulfenate

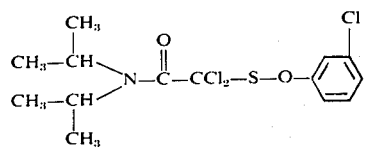

Calculated for $C_{14}H_{18}Cl_3NO_2S$: C, 45.36; H, 4.89
Found: C, 45.71; H, 5.01

EXAMPLE 8

To a suitable reaction vessel equipped with an agitator is charged approximately 100 ml. of benzene and approximately 2.92 g., about 0.01 moles, of dichloro(phenylsulfonyl)methane sulfenyl chloride. After the chloride is dissolved in the benzene, approximately 1 g., in excess of 0.01 moles, of methanol and approximately 1 g., about 0.01 moles, of triethyl amine are added to the solution. The reaction mass is stirred for about 1 hour and the hydrochloride salt precipitate which forms is separated from the liquid by filtration. The benzene is removed by distillation leaving a residual oil. The residual oil is dissolved in petroleum ether and cooled in dry ice whereupon a precipitate forms. The precipitate which forms is separated from the ether by filtration, found to have a melting point of about 77° to 79°C., and identified as methyl dichloro(phenylsulfonyl)methane sulfenate

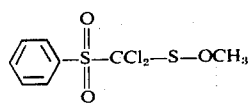

Calculated for $C_8H_8Cl_2O_3S_2$: C, 33.46; H, 2.81
Found: C, 33.50; H, 2.76

EXAMPLES 9 THROUGH 13

The procedure of Example 5 is followed except that, in place of about 2.2 g. of resorcinol, an approximately equimolecular amount of the compound of Column A is charged and the product of Column B is obtained. In each of the formulas of Column B the moiety R- represents

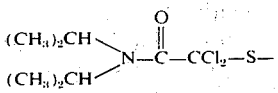

| Example | A | B |
|---|---|---|
| 9 | 1,3-dihydroxy-5-methylbenzene (CH₃ on ring, two OH groups) | methyl-substituted phenyl with two O—R groups |
| 10 | 2,3,5-trichloro-1,4-dihydroxybenzene | dichloro-substituted phenyl with two O—R groups |
| 11 | 4-pentylresorcinol ((CH₂)₄CH₃, two OH) | pentyl-substituted phenyl with two O—R groups |
| 12 | 4-(trifluoromethyl)resorcinol (CF₃, two OH) | CF₃-substituted phenyl with two O—R groups |
| 13 | 2,5-dibromo-1,4-dihydroxybenzene (Br, OH, Br, OH) | dibromo-substituted phenyl with two O—R groups |

EXAMPLES 14 THROUGH 31

The procedure of Example 1 is followed except that, in place of about 3.12 g. of 2-(chlorothio)-2,2-dichloro-N-isopropylacetanilide, an approximately equimolecular amount of the compound of Column A is charged and the product of Column B is obtained. Where the products of Column B are liquids rather than solids, the products are purified by vacuum distillation rather than by recrystallization.

| Example | A | B |
|---|---|---|
| 14 | N≡C—CCl$_2$—S—Cl | N≡C—CCl$_2$—S—OCH$_3$ |
| 15 | 4-Br-C$_6$H$_4$—SO$_2$—CCl$_2$—S—Cl | 4-Br-C$_6$H$_4$—SO$_2$—CCl$_2$—S—OCH$_3$ |
| 16 | 2,6-(CH$_3$)$_2$-C$_6$H$_3$—SO$_2$—CCl$_2$—S—Cl | 2,6-(CH$_3$)$_2$-C$_6$H$_3$—SO$_2$—CCl$_2$—S—OCH$_3$ |
| 17 | 3-CF$_3$-C$_6$H$_4$—SO$_2$—CCl$_2$—S—Cl | 3-CF$_3$-C$_6$H$_4$—SO$_2$—CCl$_2$—S—OCH$_3$ |
| 18 | 3,4,5-Cl$_3$-C$_6$H$_2$—C(O)—CCl$_2$—S—Cl | 3,4,5-Cl$_3$-C$_6$H$_2$—C(O)—CCl$_2$—S—OCH$_3$ |
| 19 | C$_6$H$_5$—C(O)—CCl$_2$—S—Cl | C$_6$H$_5$—C(O)—CCl$_2$—S—OCH$_3$ |
| 20 | 2-CF$_3$-C$_6$H$_4$—C(O)—CCl$_2$—S—Cl | 2-CF$_3$-C$_6$H$_4$—C(O)—CCl$_2$—S—OCH$_3$ |
| 21 | 4-C$_2$H$_5$-C$_6$H$_4$—C(O)—CCl$_2$—S—Cl | 4-C$_2$H$_5$-C$_6$H$_4$—C(O)—CCl$_2$—S—OCH$_3$ |
| 22 | 2,6-(i-C$_3$H$_7$)$_2$-C$_6$H$_3$—C(O)—CCl$_2$—S—Cl | 2,6-(i-C$_3$H$_7$)$_2$-C$_6$H$_3$—C(O)—CCl$_2$—S—OCH$_3$ |
| 23 | C$_2$H$_5$—O—C(O)—CCl$_2$—S—Cl | C$_2$H$_5$—O—C(O)—CCl$_2$—S—OCH$_3$ |
| 24 | (CH$_3$)$_2$CHCH$_2$—O—C(O)—CCl$_2$—S—Cl | (CH$_3$)$_2$CHCH$_2$—O—C(O)—CCl$_2$—S—OCH$_3$ |
| 25 | C$_6$H$_5$CH$_2$—O—C(O)—CCl$_2$—S—Cl | C$_6$H$_5$CH$_2$—O—C(O)—CCl$_2$—S—OCH$_3$ |
| 26 | CH$_3$—O—C(O)—CCl$_2$—S—Cl | CH$_3$—O—C(O)—CCl$_2$—S—OCH$_3$ |
| 27 | (CH$_2$)$_4$N—C(O)—CCl$_2$—S—Cl | (CH$_2$)$_4$N—C(O)—CCl$_2$—S—OCH$_3$ |
| 28 | (CH$_2$)$_8$N—C(O)—CCl$_2$—S—Cl | (CH$_2$)$_8$N—C(O)—CCl$_2$—S—OCH$_3$ |
| 29 | [(CH$_3$)$_2$CHCH$_2$]$_2$N—C(O)—CCl$_2$—S—Cl | [(CH$_3$)$_2$CHCH$_2$]$_2$N—C(O)—CCl$_2$—S—OCH$_3$ |

—Continued

| Example | A | B |
|---|---|---|
| 30 | $(C_2H_5OCH_2)_2N-\overset{O}{\underset{\|}{C}}-CCl_2-S-Cl$ | $(C_2H_5OCH_2)_2N-\overset{O}{\underset{\|}{C}}-CCl_2-S-OCH_3$ |
| 31 | $CH_3$ and 3-$CF_3$-phenyl on N, $-\overset{O}{\underset{\|}{C}}-CCl_2-S-Cl$ | $CH_3$ and 3-$CF_3$-phenyl on N, $-\overset{O}{\underset{\|}{C}}-CCl_2-S-OCH_3$ |

EXAMPLES 32 THROUGH 39

The procedure of Example 1 is followed except that, in place of about 1 g. of methanol, an approximately equimolecular amount of the compound of Column A is charged and the product of Column B is obtained. Where the products of Column B are liquids rather than solids, the products are purified by vacuum distillation rather than by recrystallization.

| Example | A | B |
|---|---|---|
| 32 | $C_2H_5OH$ | $C_6H_5,(CH_3)_2CH$–$N-\overset{O}{\underset{\|}{C}}-CCl_2-S-OC_2H_5$ |
| 33 | $(CH_3)_2CHOH$ | $C_6H_5,(CH_3)_2CH$–$N-\overset{O}{\underset{\|}{C}}-CCl_2-S-OCH(CH_3)_2$ |
| 34 | $CH\equiv C-CH_2OH$ | $C_6H_5,(CH_3)_2CH$–$N-\overset{O}{\underset{\|}{C}}-CCl_2-S-OCH_2C\equiv CH$ |
| 35 | $CH_3CH_2CH=CHCH_2OH$ | $C_6H_5,(CH_3)_2CH$–$N-\overset{O}{\underset{\|}{C}}-CCl_2-S-OCH_2CH=CHCH_2CH_3$ (with CH₃) |
| 36 | $(CH_3)_3C$-C₆H₄-$OH$ | $C_6H_5,(CH_3)_2CH$–$N-\overset{O}{\underset{\|}{C}}-CCl_2-S-O$-C₆H₄-$C(CH_3)_3$ |
| 37 | $CH_3(CH_2)_4OH$ | $C_6H_5,(CH_3)_2CH$–$N-\overset{O}{\underset{\|}{C}}-CCl_2-S-O(CH_2)_4CH_3$ |
| 38 | 2,4-$Br_2$-C₆H₃-$OH$ | $C_6H_5,(CH_3)_2CH$–$N-\overset{O}{\underset{\|}{C}}-CCl_2-S-O$-(2,4-Br₂-C₆H₃) |
| 39 | 2,4-$(C_2H_5)_2$-C₆H₃-$OH$ | $C_6H_5,(CH_3)_2CH$–$N-\overset{O}{\underset{\|}{C}}-CCl_2-S-O$-(2,4-(C₂H₅)₂-C₆H₃) |

EXAMPLE 40

The procedure of Example 1 is followed except that, instead of removing the precipitate from the reaction mass, by filtration after stirring for about 1 hour, about 200 ml. of water are added to the mass and the mass is stirred until the precipitate is no longer visible. The mass then separates into an organic and an aqueous phase, the aqueous phase, which contains the dissolved precipitate, is removed and the organic phase is then processed as in Example 1. The product of Example 1 is obtained.

EXAMPLES 41 and 42

The procedure of Example 1 is followed except that in place of approximately 2 g. of triethyl amine, about 0.02 moles of the specified trialkyl amine is added. The product of Example 1 is obtained.

Example 41 -Tripropyl amine.
Example 42 -Tributyl amine.

EXAMPLE 43

Contact herbicidal activity of representative substituted dichloromethane sulfenyl esters of this invention is determined by the following procedure:

The compound to be tested is applied in spray form to plants of a given age of several grasses and broadleaf species. After the plants are the desired age, each aluminum pan is sprayed with a given volume of a 0.2% concentration solution of the candidate chemical, corresponding to a rate of approximately 4 lbs. per acre. This solution is prepared from an aliquot of a 2% solution of the candidate compound in acetone, a known amount of cyclohexanone-emulsifying agent mix, and sufficient water to make up to volume. The emulsifying agent is a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants are then observed approximately 14 days later and the results are recorded.

Contact herbicidal activity of the compounds prepared in the designated Examples is observed against the species as shown in Table I. X denotes that herbicidal activity is observed.

TABLE 1

| Compound of Example Number | 1 | 2 | 5 |
|---|---|---|---|
| Canada thistle |  | X |  |
| Lambsquarter |  | X | X |
| Quackgrass | X |  |  |

EXAMPLE 44

Pre-emergent herbicidal activity of representative substituted dichloromethane sulfenyl esters of this invention is determined by the following procedure:

A good grade of top soil is placed in aluminum pans and compacted to a depth of ⅜ to ½ inch from the top of the pan. A pre-determined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain a rate of application of 5 lbs. per acre. The pans are then placed on a sand bench in the greenhouse and watered from below as needed. The plants are observed at the end of approximately 14 days and the results recorded.

Pre-emergent activity of the compounds prepared in the designated Examples is observed against the species as shown in Table II. X denotes that herbicidal activity is observed. - denotes that the species was not tested.

TABLE II

| Compound of Example Number | 1 | 2 | 3 | 5 |
|---|---|---|---|---|
| Canada Thistle |  |  |  |  |
| Cocklebur |  |  | X |  |
| Lambsquarter |  | X |  | X |
| Smartweed |  | — |  | X |
| Nutsedge | X |  | X |  |
| Quackgrass |  | X |  |  |
| Johnson grass |  | X | X | X |
| Downy brome | X |  |  |  |
| Barnyard grass | X | X |  |  |

While this invention has been described with respect to certain embodiments it is to be understood that it is not so limited and that variations and modifications thereof obvious to those skilled in the art to which this invention appertains can be made without departing from the spirit or scope thereof.

What is claimed is:

1. A compound having the formula

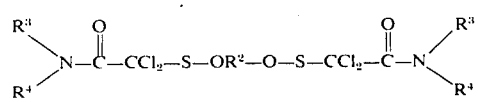

wherein
$R^2$ is phenylene, lower alkyl phenylene or halophenylene, $R^3$ is lower alkyl or lower alkoxyalkyl and $R^4$ is phenyl, halophenyl, lower alkyl phenyl, lower alkyl or lower alkoxyalkyl.

2. A compound of claim 1 wherein $R^3$ and $R^4$ are each lower alkyl.

3. A compound of claim 2 wherein $R^3$ and $R^4$ are each isopropyl.

4. The compound of claim 3 wherein $R^2$ is phenylene.

* * * * *